No. 832,080. PATENTED OCT. 2, 1906.
M. L. PORTER.
VEHICLE WHEEL.
APPLICATION FILED OCT. 23, 1905.

Witnesses
C. H. Griesbauer

Inventor
M. L. Porter
by H. R. Wilson
Attorney

UNITED STATES PATENT OFFICE.

MARTIN LUTHER PORTER, OF REDDING, CALIFORNIA.

VEHICLE-WHEEL.

No. 832,080.  Specification of Letters Patent.  Patented Oct. 2, 1906.

Application filed October 23, 1905. Serial No. 283,991.

*To all whom it may concern:*

Be it known that I, MARTIN LUTHER PORTER, a citizen of the United States, residing at Redding, in the county of Shasta and State of California, have invented certain new and useful Improvements in Vehicle-Wheels; and I do declare the following to be a full, clear, and exact description of the invention, such as will enable others skilled in the art to which it appertains to make and use the same.

My invention relates to improvements in vehicle-wheels, and more particularly to the hubs thereof and the means for securing the spokes therein.

The object of the invention is to provide a simple, durable, and comparatively inexpensive wheel-hub in which the spokes will be firmly secured and in which they may be quickly replaced when broken.

With the above and other objects in view the invention consists of certain novel features of construction, combination, and arrangement of parts, as will be hereinafter described and claimed.

Figure 1:
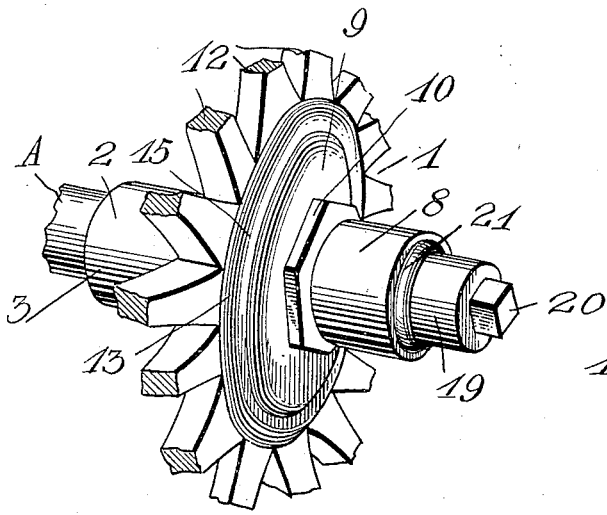
Figure 4:
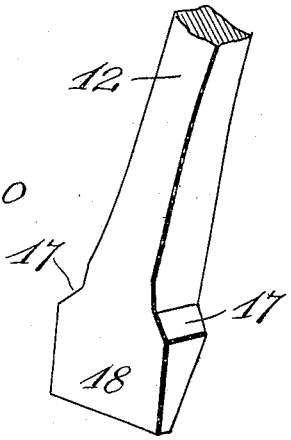
Figure 2:
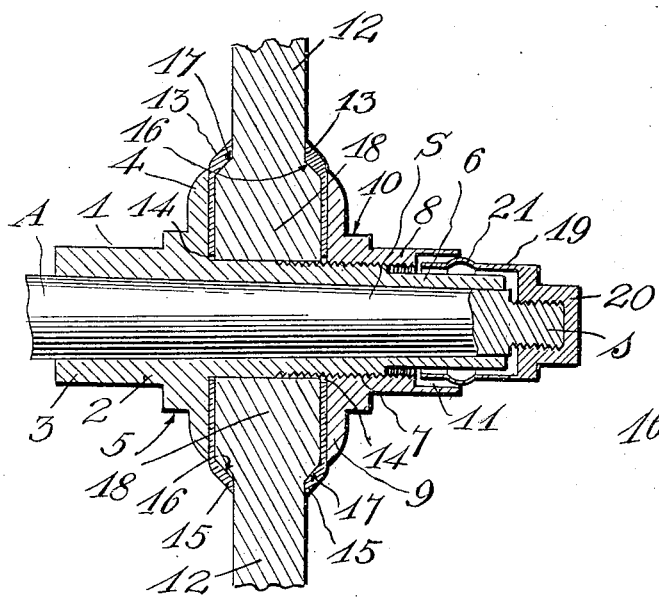
Figure 3:
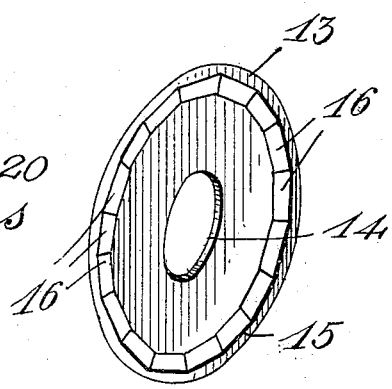

In the accompanying drawings, Figure 1 is a perspective view of the hub of a vehicle-wheel constructed in accordance with my invention. Fig. 2 is a longitudinal sectional view through the same. Fig. 3 is a perspective view of one of the clamping-collars, and Fig. 4 is a perspective view of the inner end of one of the spokes.

Referring to the drawings by numeral, 1 denotes my improved vehicle-wheel hub, which comprises a bearing-sleeve 2, formed with a bore to fit the spindle S of a vehicle-axle A. At the enlarged inner end 3 of the sleeve is formed an annular stop flange or collar 4, on the outer face of which is a polygonal surface 5, which is adapted to be engaged by a wrench or the like when the parts of the hub are being secured together or separated, as presently explained.

Adjacent to the reduced outer end 6 of the bearing-sleeve are formed screw-threads 7, which are adapted to be engaged by similar screw-threads formed in a clamping-nut 8. The latter is in the form of a tube or sleeve having at one end an annular collar or flange 9, on the outer face of which is formed a polygonal surface 10, similar to the surface 5. When wrenches or the like are engaged with the two surfaces 5 10, the nut may be quickly screwed onto or off the bearing-sleeve. The outer end of the nut 8 has its interior recessed or reduced, as at 11, for a purpose presently explained.

The spokes 12 of the wheel are adapted to be removably clamped between two clamping disks or plates 13, which are placed upon the bearing-sleeve between the collar 4 thereof and the collar 9 of the nut. Each of these disks or plates 13 is formed with a central opening 14 to receive the bearing-sleeve and with an inwardly-extending annular flange or rim 15, so that the disk or plate is dished or of concave form. The inner face of the flange or rim 15 consists of a plurality of flat faces 16, each of which corresponds in length and width to the length and width of shoulders 17, formed upon the opposite sides of the enlarged inner ends 18 of the spokes. These ends 18 are of segmental form, so that they fit against each other and between the flat inner faces of the two clamping plates or disks 13. The extreme inner ends of the enlarged portions 18 of the spokes bear against the sleeve 2, and the shoulders 17 are engaged by the rims or flanges 15, so that the spokes are held firmly and secured in position. As will be readily seen upon reference to Fig. 1, the two disks or plates 13 are clamped upon the spokes between the collars 4 9 of the sleeve and nut.

The outer end of the nut 8 of the sleeve is recessed, as at 11, in order to receive a sleeve 19, provided upon a nut 20, which is screwed upon the threaded outer end $s$ of the spindle S. This sleeve 19 is of less diameter than the interior diameter of the recessed portion 11 of the nut 8 and is formed with an annular rib or bead 21, which is adapted to enter the recessed portion 11 and is of almost the same exterior diameter as the interior diameter of said portion 11. This construction prevents the entrance of dust and dirt between the sleeve and the nut 8, and hence between the spindle and the bearing-sleeve.

The construction and advantages of the invention will be readily understood from the foregoing description, taken in connection with the accompanying drawings. It will be seen that when a vehicle-hub is constructed in this manner it may be quickly and easily repaired and one or more spokes may be removed and replaced without removing the wheel-rim. By providing the clamping disks or plates 13 with the flanges 15 and their flat faces 16 to engage the shoulders 17 upon the spokes the latter are held rigidly in position and are prevented from turning and twisting.

Various changes in the form, proportion, and the minor details of construction may be resorted to without departing from the principle or sacrificing any of the advantages of this invention.

Having thus described my invention, what I claim as new, and desire to secure by Letters Patent, is—

In a wheel-hub, the combination of a bearing-sleeve having an annular collar adjacent to one end and screw-threads adjacent to its opposite end, spokes having tapered inner ends formed on their opposite sides with shoulders, a nut having internal screw-threads on said sleeve and an annular collar, and a pair of clamping-disks upon said sleeve between its collar and the collar of said nut, said disks having inwardly-projecting annular flanges formed on their inner sides with flat faces to engage the shoulders on said spokes, substantially as described.

In testimony whereof I have hereunto set my hand in presence of two subscribing witnesses.

MARTIN LUTHER PORTER.

Witnesses:
GEO. W. BUSH,
M. F. ELDRIDGE.